United States Patent [19]

Ishii et al.

[11] Patent Number: 4,513,718
[45] Date of Patent: Apr. 30, 1985

[54] APPARATUS FOR CONTROLLING IGNITION TIMING FOR INTERNAL COMBUSTION ENGINES

[75] Inventors: Toshio Ishii, Katsuta; Noboru Sugiura, Mito, both of Japan

[73] Assignee: Hitachi, Ltd., Tokyo, Japan

[21] Appl. No.: 597,750

[22] Filed: Apr. 6, 1984

[30] Foreign Application Priority Data

Apr. 8, 1983 [JP] Japan .................................. 58-60824

[51] Int. Cl.³ .............................................. F02P 5/14
[52] U.S. Cl. .................................... 123/425; 123/435; 73/35; 73/116
[58] Field of Search ................... 123/425, 435, 416; 73/35, 116

[56] References Cited
U.S. PATENT DOCUMENTS 4,233,944 11/1980 Omori et al. ......................... 123/425
4,378,771 4/1983 Sawada et al. ...................... 123/425
4,413,599 11/1983 Shigematsu et al. ................ 123/416
4,462,362 7/1984 Bonitz et al. ........................ 123/425

Primary Examiner—Parshotam S. Lall
Attorney, Agent, or Firm—Antonelli, Terry & Wands

[57] ABSTRACT

An ignition timing control apparatus for an internal combustion engine wherein an ignition timing $\theta$ of at least one cylinder of the engine is retarded (or advanced) by a little amount $\Delta\alpha$ to intentionary check the generation sensitivity of a knock detection signal, that is, the detection sensitivity of knocking, then a knock judging level is modified thereby to judge as to whether knock is produced or not on the basis of the modified knock judging level, in order to correct and control the ignition timing $\theta$ of the engine. As a result, irrespective of the non-uniformity of properties of the knock detection device and an internal combustion engine due to the deterioration with age or manufacturing errors, correct judgement of knocking can always be insured.

12 Claims, 28 Drawing Figures

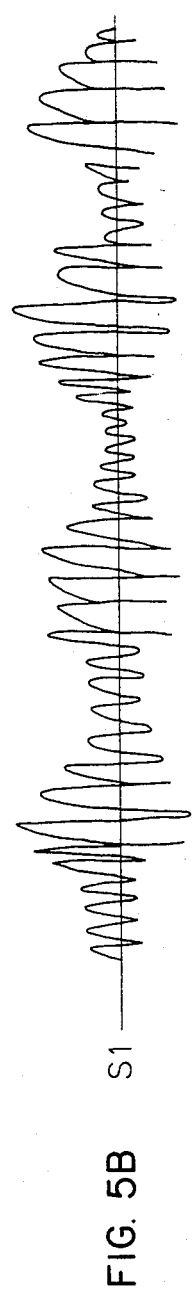
FIG. 5A  V<sub>IN</sub>
FIG. 5B  S1
FIG. 5C  S2
FIG. 5D  S3

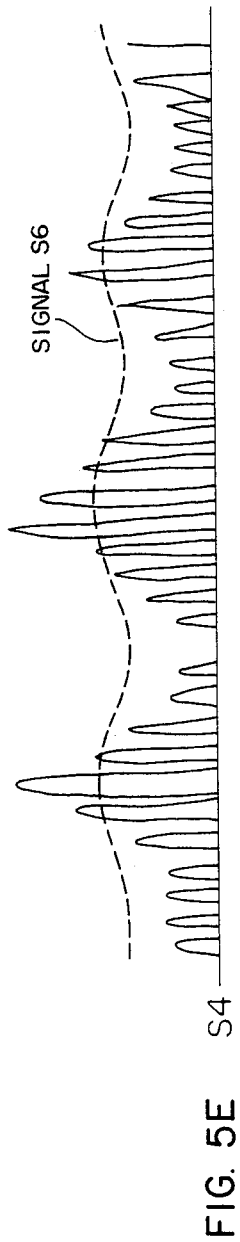
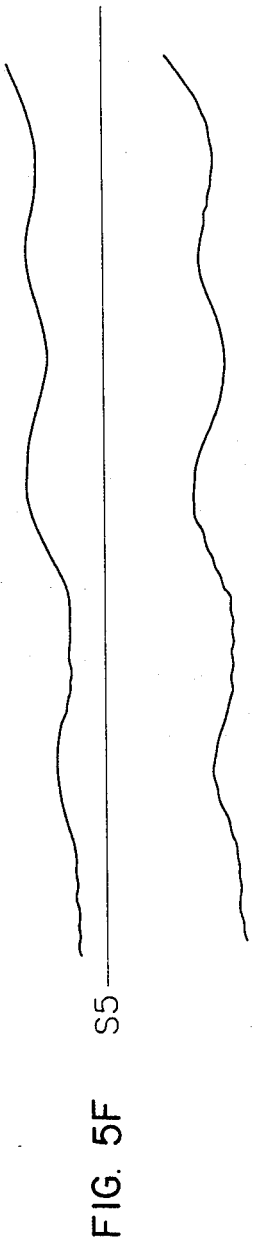
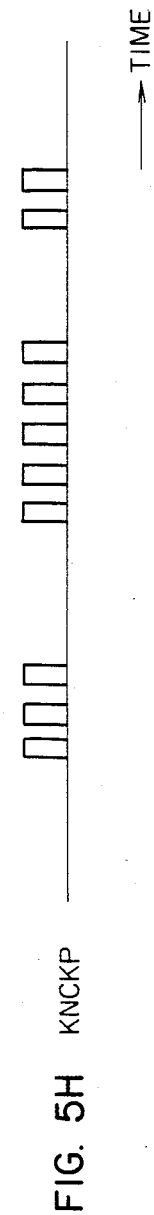
FIG. 5E  S4  SIGNAL S6
FIG. 5F  S5
FIG. 5G  S6
FIG. 5H  KNCKP
TIME →

FIG. 19

| TP mmHg \ N | 500 | 1000 | 1500 | -- | -- | -- (rpm) 6000 |
|---|---|---|---|---|---|---|
| L | -500 | | | | | |
| M | -100 | NR3 | | NR 1 | | |
| M | -0 | | | | | |
| H | +100 | NR2 | | | | |
| H | +200 | | | NR4 | | |
| H | +300 | | | | | |

APPARATUS FOR CONTROLLING IGNITION TIMING FOR INTERNAL COMBUSTION ENGINES

The present invention relates to an apparatus for controlling ignition timing of internal combustion engines by correcting knock detection sensitivity.

Knocking generated in internal combustion engines causes reduction of engine output or damage due to overheating of the engines. The maximum engine output can be achieved by advancing the ignition timing to a value just before the knock occurs in the engine characteristics. If the ignition timing is further advanced the knock will occur, and if retarded further the engine output will be reduced.

It is desirable, therefore, to maintain the ignition timing at a value just before the knock occurs.

In such an ignition timing control apparatus, it is necessary to accurately judge the knock signal.

Because when the engine is used for a long time there is produced a variation of clearance of intake and exhaust valves, so that the intensity of the vibration of the engine is changed, which frequently results in an incorrect detection of the knock signal. For this reason, a checking device is required to determine whether the knock detection device is detecting proper knocking of the engine.

Examples of checking devices of this type are disclosed in Japanese Patent Laid-Open Publication Nos. 57-68559 (1982) and 57-35159 (1982).

However, those checking devices disclosed in the publications mentioned above merely judges whether the checking devices are operating or not.

Sensors used for detecting knocking are sometimes not uniform in their output characteristics, and the output characteristics differ from the original characteristics depending on the conditions of mounting the sensors on the engines. Furthermore, the characteristics alter due to deterioration with age.

For this reason, in order to judge not only whether the detection device is merely operating or not, but whether the accurate ignition timing control is achieved or not, it is necessary to check whether the detection sensitivity is appropriate or not.

It is an object of the present invention to provide an apparatus for controlling the ignition timing by checking the detection sensitivity of knocking and by correcting the detection sensitivity, if necessary.

The present invention is characterized in that means for producing ignition timing for checking is provided, and in operating checking means the ignition timing for checking is used to ignite the engine in place of normal ignition timing based on the output of knock detection means, and the reaction of the knock detection means to the ignition of the engine caused by the checking ignition timing is checked and based on the result of the checking the sensitivity of the knock detection means is corrected thereby to control the ignition timing.

According to the present invention, the knock judging level can be adjusted depending on the detecting condition of the knocking, and thus the correct judgement of the knocking can always be assured irrespective of the characteristics variations due to deterioration with age of the knock detecting means and irrespective of the non-uniformity of the ignition timing control apparatus due to manufacturing errors. Furthermore, when the present invention is utilized, even if the knock judging level is not adjusted upon mounting the engine on the automobile, an ideal knock judging level can be set automatically, and hence the troublesome adjusting process is advantageously eliminated.

The present invention will be apparent from the following detailed description taken in conjunction with the accompanying drawings, in which:

FIGS. 5A to 5H show signal waveforms at various parts in the block diagram of FIG. 4;

FIG. 19 is a diagram showing engine operating conditions classified into four areas;

Figure 1:
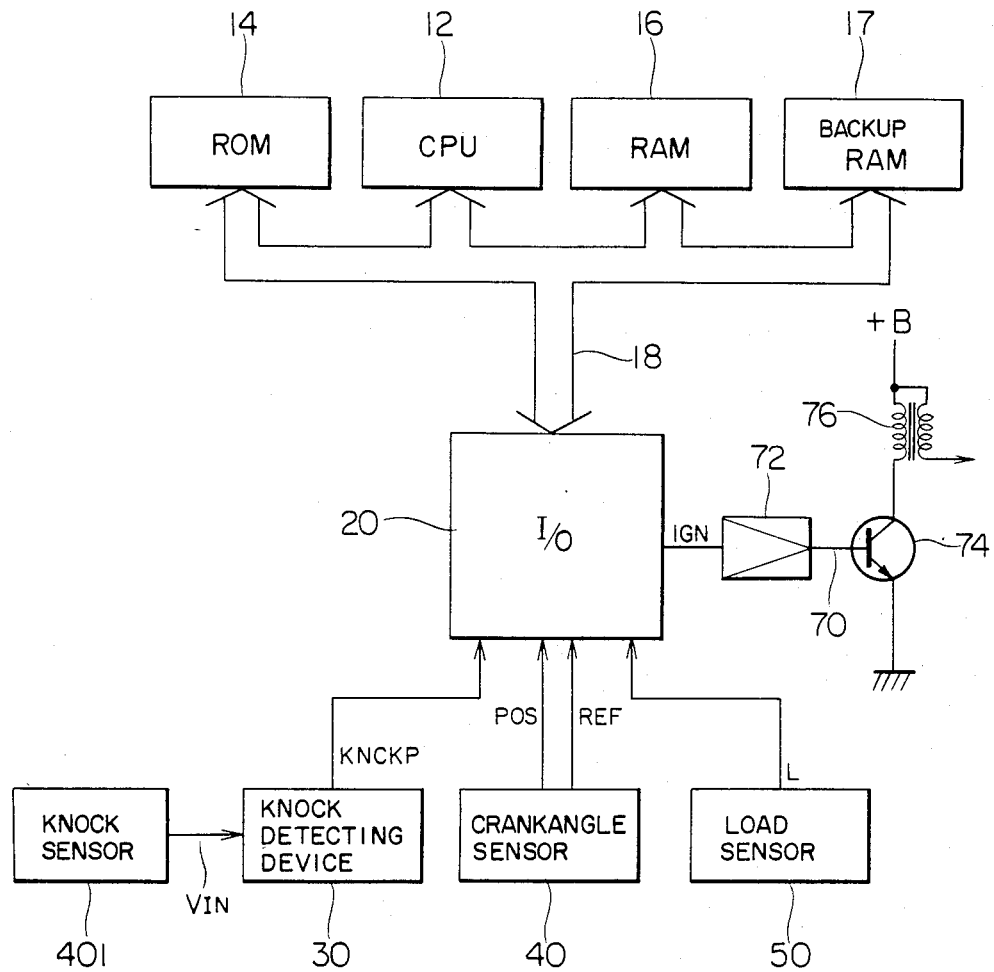
FIG. 1 is a block diagram of an ignition timing control section of an internal combustion engine control system to which the present invention is applied.

A first embodiment of the present invention will be described in detail with reference to the drawings. FIG. 1 shows an ignition timing control section of an internal combustion engine control system to which the present invention is applied.

A central processing unit (hereinafter referred to as CPU) 12 performs digital arithmetic processing of various data including ignition timing of an internal combustion engine. In a ROM 14, programs for ignition timing control and other controls and fixed data are stored. A RAM 16 is a memory element capable of reading and writing. A backup RAM 17 is a RAM which maintains the stored data even when the engine is not running. The CPU 12 receives via an input/output interface circuit 20 signals from various sensors including, in this embodiment a knock detection device 30, crankangle sensor 40 and load sensor 50, and calculates the ignition timing based on the signals and in accordance with the program stored in the ROM 14. Then the CPU 12 outputs an ignition signal IGN via the input/output interface circuit 20. The ignition signal IGN is applied to the base of a power transistor 74 via an amplifier 72 to drive the power transistor 74. When the power transistor 74 is shut off, ignition current is induced in the secondary coil of an ignition coil 76.

Figure 2:
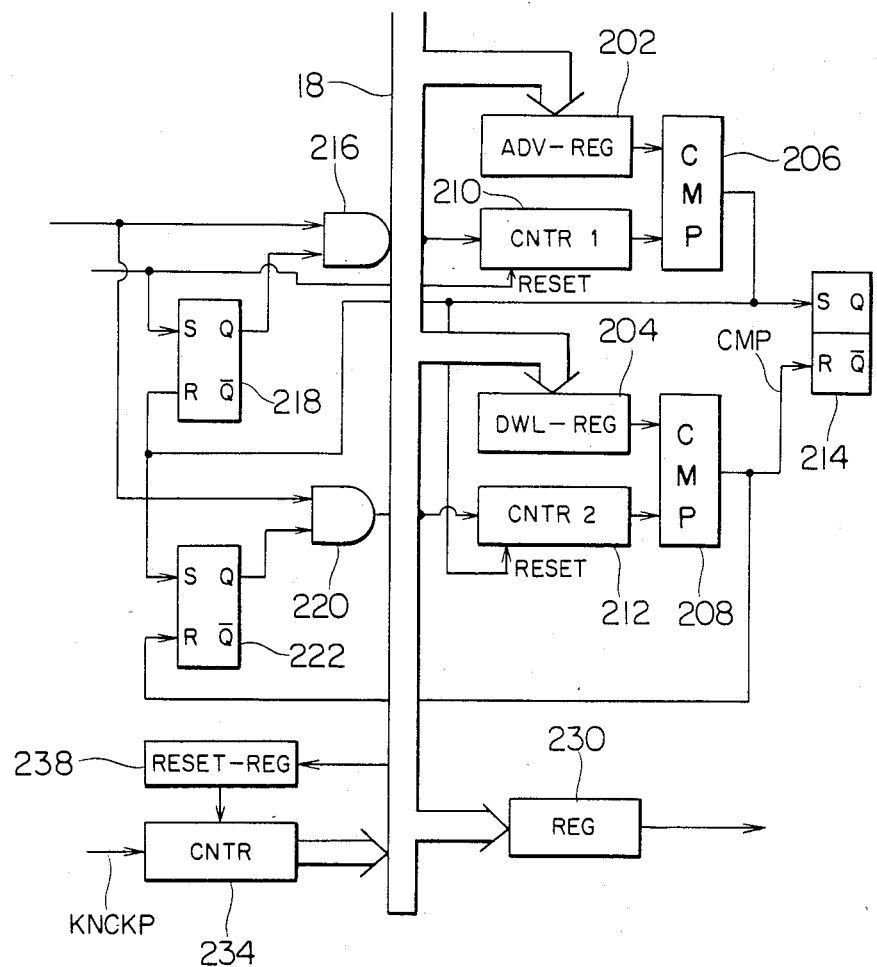
FIG. 2 is a schematic block diagram of a part of the input/output interface circuit of the embodiment of FIG. 1 which part participates in the ignition timing control.

FIG. 2 shows a concrete arrangement of a part of the input/output interface circuit 20 which contribute to the ignition timing control. A position pulse signal (referred to as POS) from the crankangle sensor 40 is applied to an AND circuits 216 and 220. Further, a reference crankangle signal (REF) from the crankangle sensor 40 is applied to the reset terminal of a first counter register 210 and to the set terminal of an RS flip-flop 218. The first counter register 210 commences counting of the POS signal following the operation of the AND circuit 216 and RS flip-flop 218 and based on the rising of the REF signal, and delivers the count value to a comparator 206. The comparator 206 compares the count value from the first counter register with ignition data $\theta_{ig}$ calculated by the CPU 12 and stored in an advance register 202, and if the both values are coincident with each other, the comparator 206 outputs a set pulse to an RS flip-flop 214 and at the same time resets the RS flip-flop 218. When the set pulse is inputted to the RS flip-flop 214, an output of the $\overline{Q}$ output is shut off, and the power transistor 74 of the ignition system is also shut off and discharge current is outputted to the secondary coil of the ignition coil 76.

Then, description will be made as to the starting time of energization of the ignition coil. A second coutner register 212 commences counting of the position pulse POS entered via the AND circuit 220, based on the set pulse which is derived from the comparator 206 for turning ON the RS flip-flop 214, and the counted value is outputted to a comparator 208. The comparator 208 compares the counted value with a value which is calculated by the CPU 12 and stored in a dwell register 204, and when the both values are coincident, the comparator 208 outputs a reset pulse to the RS flip-flop 214 and at the same time resets the RS flip-flop 222. The RS flip-flop 214 in response to the reset pulse produces an output at the $\overline{Q}$ terminal to turn ON the power transistor 714 and energization of the primary coil of the ignition coil is started.

Next, description will be made as to supplying of a knock signal KNCKP to the CPU 12.

The output pulse KNCKP from the knock detecting device 30 has been inputted to a counter register 234, and the number of pulses KNCKP proportional to the intensity of knocking generated in the engine is counted. At the time of completion of this counting, the CPU 12 is interrupted and at the same time as the count value enter into the CPU 12 via a bus 18, the count value of the count register 234 is cleared by a reset resister 238 to prepare for the next occurence of knocking. The pulse number NP supplied to the CPU 12 is data corresponding to the intensity of knocking and it is used to calculate a correction amount of the ignition timing.

Figure 3:
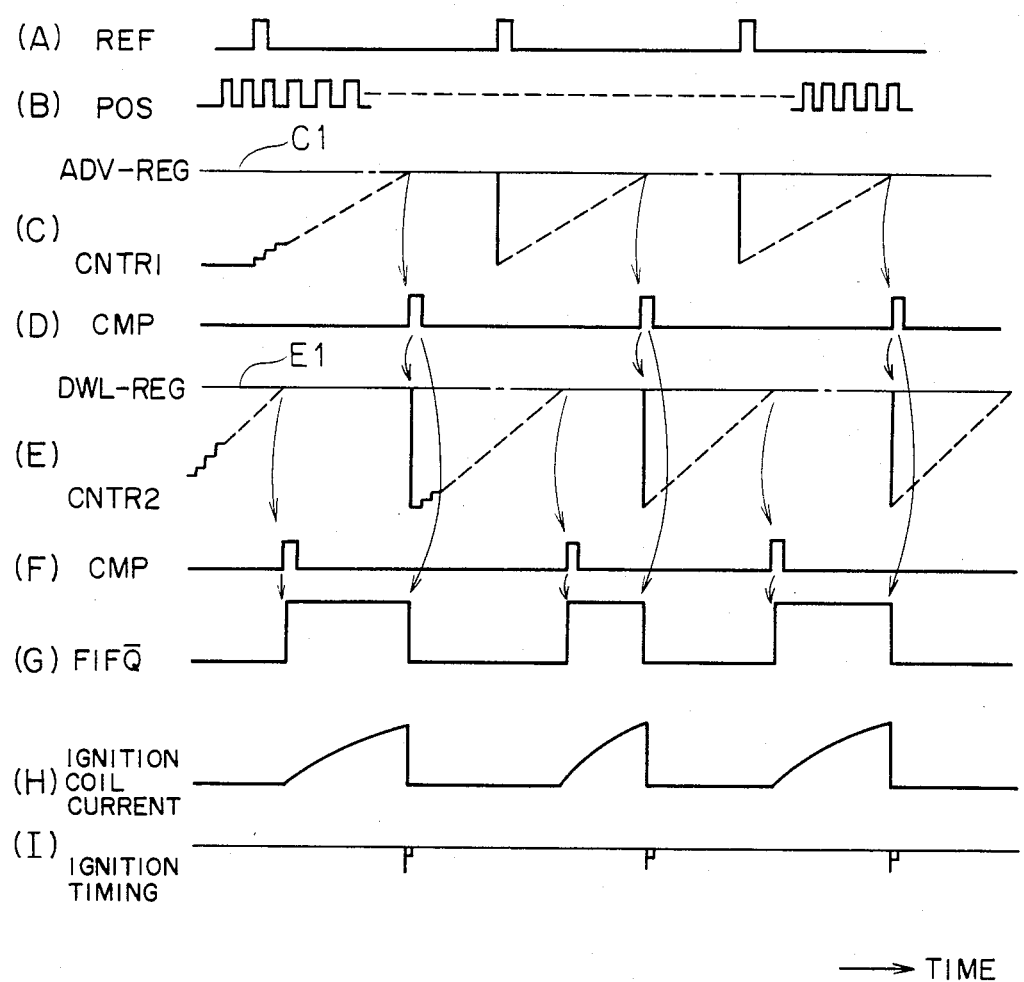
FIG. 3 is a timing chart illustrating the operation of the circuitry of FIG. 2.

FIG. 3 is a timing chart illustrating the operation of the interface circuit shown in FIG. 2. In FIG. 3, the reference crankagle signal is shown at (A), position pulse signal at (B), and a counting condition of the first count register at (C), and a curve $C_1$ represents a set value of the advance register 202. The output signal of the first count register 206 is shown at (D), and it is shown that the output is produced when the count value of the first counter register 210 reaches the set value of the advance register 202. At (E), a counting condition of the second counter register 212 is shown in that a curve $E_1$ represents a set value of the dwell register 204. At (F) the output of the comparator 208 is shown and the operation thereof is similar to that of the comparator 206. At (G), the $\overline{Q}$ output of the RS flip-flop 214 is shown, and the $\overline{Q}$ output is produced in response to the outputs of the comparators 206 and 208, that is, shown at (D) and (F). At (H), the current in the ignition coil 66 is shown, which current flows in response to the $\overline{Q}$ output. At (I), the ignition timing is shown.

Figure 4:
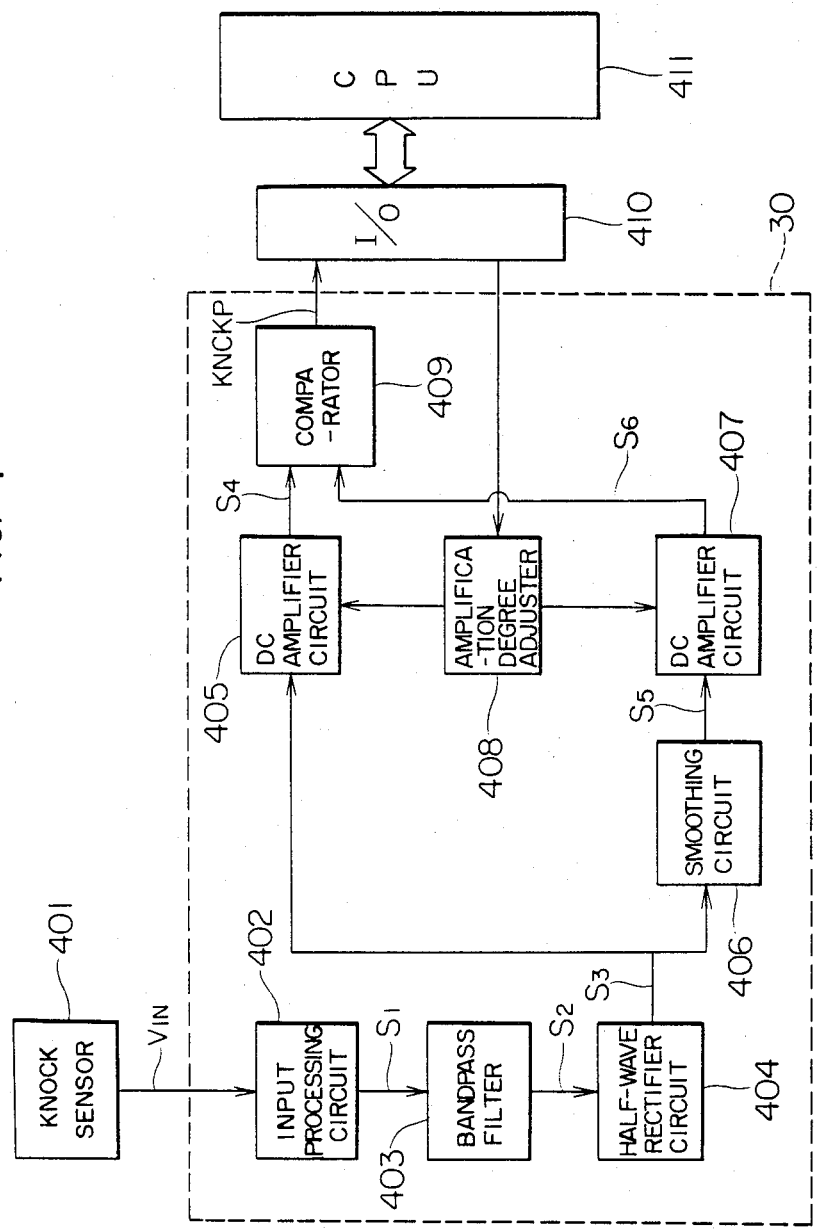
FIG. 4 is a block diagram of the knock detecting device in a first embodiment.

FIG. 4 is a block diagram of the knock detecting device 30 which produces the pulse KNCKP in response to the occurence of knock, and the number of the pulses are corresponding to the knock intensity. In FIG. 4, a knock sensor 401 is comprised of a piezoelectric element and it converts knocking vibrations of the engine cylinder into an electrical signal. The output signal $V_{IN}$ of the knock sensor 401 is inputted to a bandpass filter 403 via an input processing circuit 402. The bandpass filter 403 is provided to eliminate parastic oscillations of the engine and to efficiently pick up a knock signal, and a bandwidth is selected so that it corresponds to a frequency range of the knock signal, for example, 7 to 8 kHz. The knock signal passed through the bandpass filter 403 has its amplitude varied depending upon the intensity of knocking condition, that is, light knock, middle knock and heavy knock. The knock signal passing through the bandpass filter 403 is half-wave rectified by a half-wave rectifier circuit 404 and then the knock signal is split into two routes. One signal through one of the two routes is used as a knock representing signal and it is amplified by a DC amplifier 405 and supplied to a comparator 409. The other signal of the other route is used to produce a judging level for detecting the knocking and for this purpose this signal is smoothed by a smoothing circuit 406 and amplified by a DC amplifier circuit 407 and then supplied to the comparator 409. The comparator 409 compares the two signals through the two routes and produces the knock detection signal KNCKP which is outputted to the input/output interface 410. An amplification degree adjuster 408 alters the amplification degree of the amplifiers 405 and 407 thereby to alter the judging level of knock detection, and it is driven by the CPU 411 via the register 230 within the input/output interface 410 to alter the knock judging level depending on the results of checking of the knock judging level as will be described hereinafter.

FIGS. 5A to 5H show signal waveforms at various points in the block diagram of FIG. 4. FIG. 5A shows the output $V_{IN}$ of the knock sensor 401, FIG. 5B shows the output $S_1$ from the input processing circuit 402, FIG. 5C shows the output $S_2$ from the bandpass filter 403, and FIG. 5D shows the half-wave rectified output $S_3$. The comparator 409 compares the amplified signal $S_4$ (FIG. 5E) of the rectified output $S_3$ with the smoothed and amplified signal $S_6$ (FIG. 5G) to produce the knock detection signal KNCKP (FIG. 5H). The amplification degree adjuster 408 alters at least one of the amplification degrees which are respectively applied to amplify the signal $S_3$ (FIG. 5D) to produce the signal $S_4$ (FIG. 5E) and to amplify the signal $S_5$ (FIG. 5F) to produce the signal $S_6$ (FIG. 5G), thereby to adjust the knock judging level.

Figure 6:
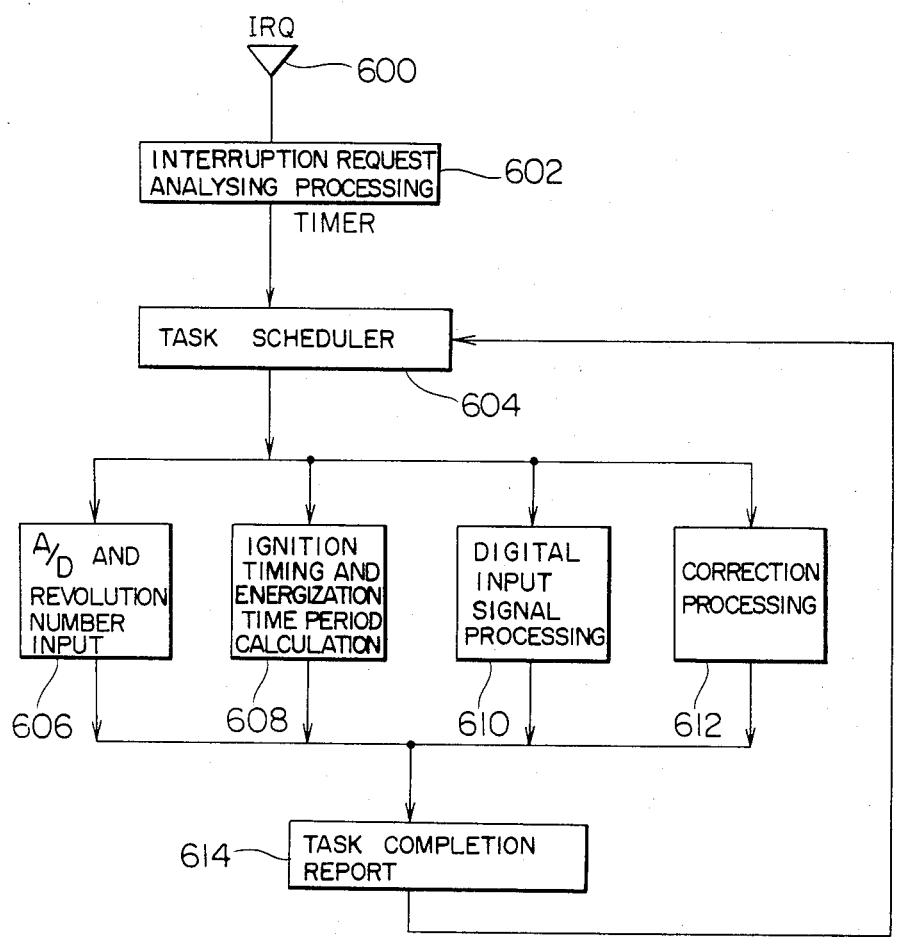
FIG. 6 is a general flow chart for explaining the operation of the ignition timing control apparatus of the first embodiment of the present invention.

FIG. 6 shows a general flow of the ignition timing control in the embodiment mentioned above. According to an instruction from a task scheduler 604 those tasks including; A/D conversion of input signal and inputting of engine revolution number (606), calculation of ignition timing and energization time period (608), processing of digital input signal (610) from the starter switch, the idle switch, and the like, and processing of correction (612) are performed.

Figure 7:
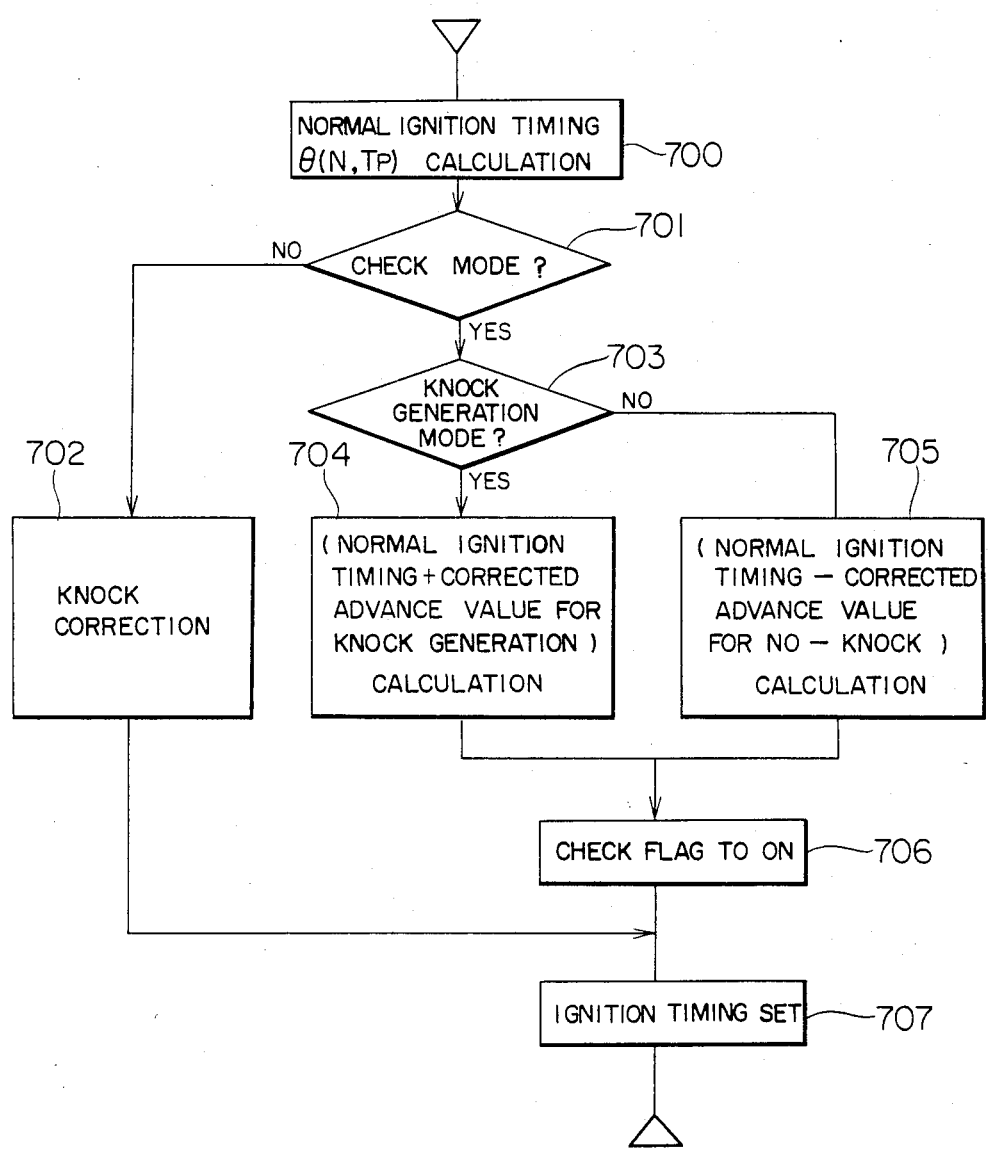
FIG. 7 is a flow chart of an ignition timing control routine.

FIG. 7 shows an ignition timing control routine. At step 700, a normal ignition timing $\theta(N, T_P)$ is calculated based on the engine revolution number N and negative pressure $T_P$. At step 701, whether a checking mode of the judging level of the knock detecting device or not is determined. To be the checking mode, for example, the engine revolution number N and engine load (equivalent to the engine negative pressure) are within a preset area. If the checking mode is determined, then at step 703 it is determined whether the judging level of the knock detecting device for ascertaining the propriety of the sensitivity of the knock detecting device should be checked after the ignition timing is forcibly advanced to a knocking area to cause the knock, or the judging level of the knock detecting device should be checked after the ignition timing is intentionary retarded to an area where knock can never occur. If the former manner of checking is determined, it is determined as being knock generating mode, and at step 704 the ignition timing is advanced intentionary to the knocking area. If the latter manner of checking is determined, at step 705 the ignition timing is retarted to the area where knock can never occur. At step 706, a check flag is set. The check flag indicates that the check is in progress.

On the other hand, at step 700, if it is determined as not being the checking mode, knock correction (step 702) is performed as will be described hereinafter with reference to FIG. 8.

At step 707, actual ignition timing $\theta_{ig}$ decided at steps 702, 704 and 705 is stored in the advance register 202 (FIG. 2).

The knock correction at step 702 will be described referring to FIG. 8.

At step 701, if it is determined as not being the check mode, the program proceeds to step 801. At step 802 the number of KNCKPs, that is, $N_P$ is received from the counter register 234. At step 803 if the pulse number $N_P$ is greater than a predetermined pulse number $N_S$, it is determined that knock exists, and knock correction at steps 804 to 807 is performed. A difference $\beta$ between the pulse number $N_P$ and the set pulse number $N_S$ is obtained, and the amount of retard $\theta_{KN(\beta)}$ corresponding to a value of $\beta$ is retrieved from a map. At step 806, if the $\beta$ is greater than a maximum value of the map, a limit value processing is performed to make $\theta_{KN}$ the maximum value of the map. The amount of retard $\theta_{KN}$ thus obtained is added to the ignition timing $\theta(N, T_P)$ obtained from engine revolution number N and engine load $T_P$, and the resultant value is used as an actual ignition timing $\theta_{ig}$. If it is determined as not being knocking condition at step 803, at step 808 a normal ignition timing $\theta(N, T_P)$ is made as the actual ignition timing $\theta_{ig}$. At step 809 returns to the routine of FIG. 7, and at step 707 the ignition timing $\theta_{ig}$ is set in the address register 202.

Figure 9:
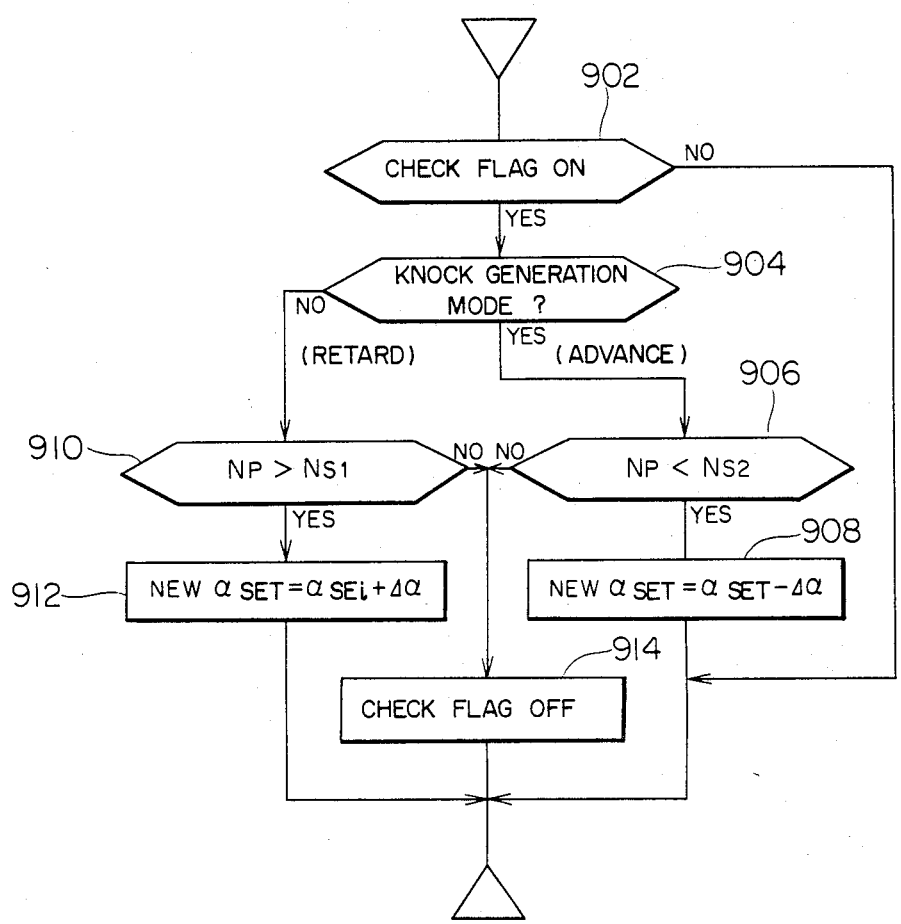
FIG. 9 is a flow chart of a knock judging level correction routine in the first embodiment.

Referring to FIG. 9, knock judging level correction in the check mode operation will be described.

After the ignition timing is advanced by a small amount from the normal timing at step 704 in FIG. 7 to intentionary cause knocking, or after the ignition timing is retarded a little amount at step 705 to intentionary prohibit occurence of knocking, in a routine of FIG. 9, correction of the knock judging level is performed based on vibrations of the internal combustion engine.

At step 902, ON or OFF of the check flag is determined when the check flag is ON, that is, when the check is in progress, at step 904 it is determined whether it is the mode wherein the knock is forcibly caused or the mode wherein the knock can never occur. If it is the mode wherein the kock is forcibly caused, at step 906 it is determined whether the pulse number $N_P$ is larger than the set number $N_{S2}$ or not. If $N_P \geq N_{S2}$, since the judging level of the knock detection device is sufficient, at step 914 the check flag is set to OFF, and the correction of the judging level is completed. If $N_P < N_{S2}$, the judging level is too high, and hence at step 908 a value of a signal $\alpha_{SET}$ which controls the amplification degree adjuster 408 in FIG. 4 is reduced. Since the signal $\alpha_{SET}$ is decreased for the amplification degree adjuster 408, either by reducing the amplification degree of the amplifier circuit 407 or by raising the amplification degree of the amplifier circuit 405, a relative difference between the knock signal and the background level is made large thereby to lower the judging level.

At step 904 when it is determined as not being the knock generating mode, at step 910 it is determined whether the knock pulse number $N_P$ is larger than a set value $N_{S1}$ or not. The set value $N_{S1}$ is determined depending on the amount of retard, etc., however, if in the area wherein no knock occurs entirely, the set value may be set to zero. If $N_P > N_{S1}$, it is considered that the knock has been detected in the engine operating condition wherein the knock can never occur, that is, the judging level is too low and even a minor vibration has been sensed as a knock signal, which indicates that the judging level must be raised. At step 912 the signal $\alpha_{SET}$ is increased to effect raising of the amplification degree of the amplifier circuit 407 or reducing the amplification degree of the amplifier circuit 405 through the operation of the amplification degree adjuster 408 thereby to reduce the relative difference between the knock signal and the background level to eventually raise the judging level. At step 910 if it is determined that $N_P \leq N_{S1}$, at step 914 the check flag is set to OFF, and completes the judging level correction.

A second embodiment will be described with reference to FIGS. 10 to 13.

Figure 10:
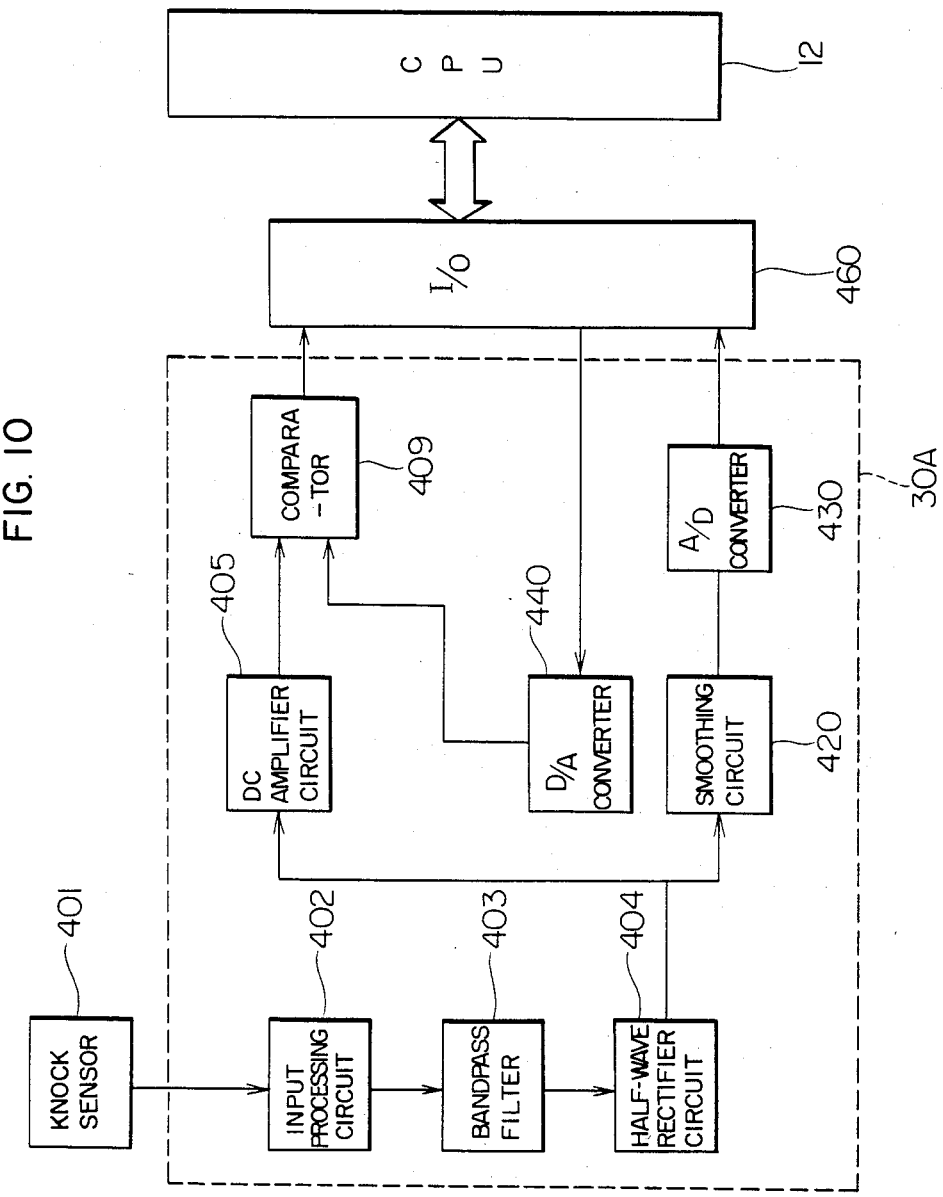
FIG. 10 is a block diagram of a knock detecting device in a second embodiment.
Figure 11:
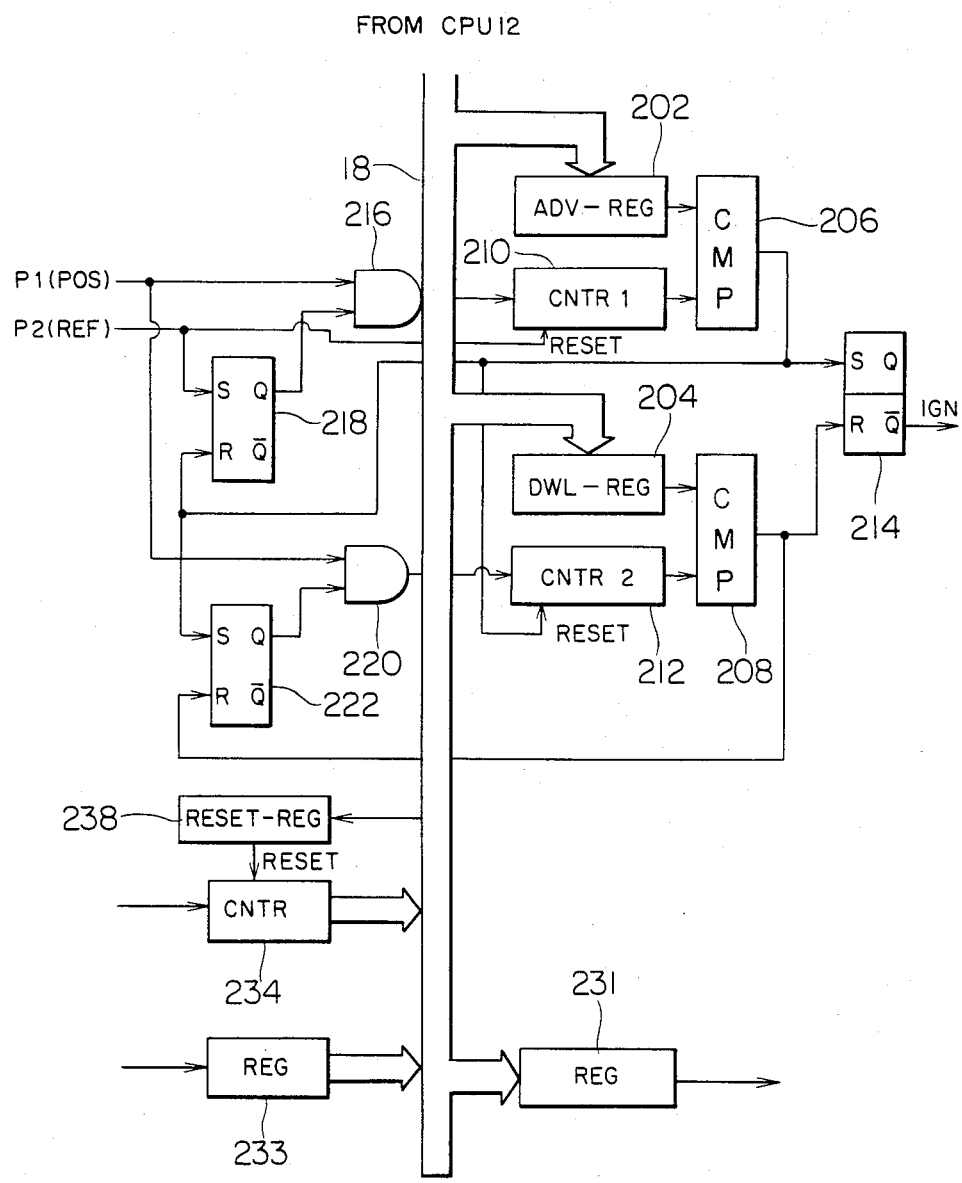
FIG. 11 is a diagram of an input/output interface circuit in the second embodiment.

FIG. 10 is a block diagram of a knock detecting device in this embodiment. It basically similar to the block diagram of FIG. 4, and similar reference numerals are attached to similar parts. FIG. 11 illustrates a concrete arrangement of a part of the input/output interface circuit 460 which part contributes to the ignition timing control. In FIG. 11, similar reference numerals are used for similar parts in FIG. 4. The output of a half-wave rectifier circuit 404 is smoothed by a smoothing circuit 420, and after conversion into a digital value $N_P BGL$ as a background signal by an A/D converter 430, stored in a register 233 within the interface circuit 460. A CPU 12 calculates a judging level signal BGL used in a comparator 409 based on the background signal $N_P$ BGL (a correction value of the judging level signal), and the judging level signal BGL is fed through a register 231 to a D/A converter 440 to D/A convert into an analog value which is supplied to the comparator 409. The comparator 409 compares this analog judging level signal BGL with the knock pulse signal half-wave rectified and amplified by a DC amplifier circuit 405, and outputs as a knock pulse signal only such a signal which exceeds the judging level.

Figure 12:
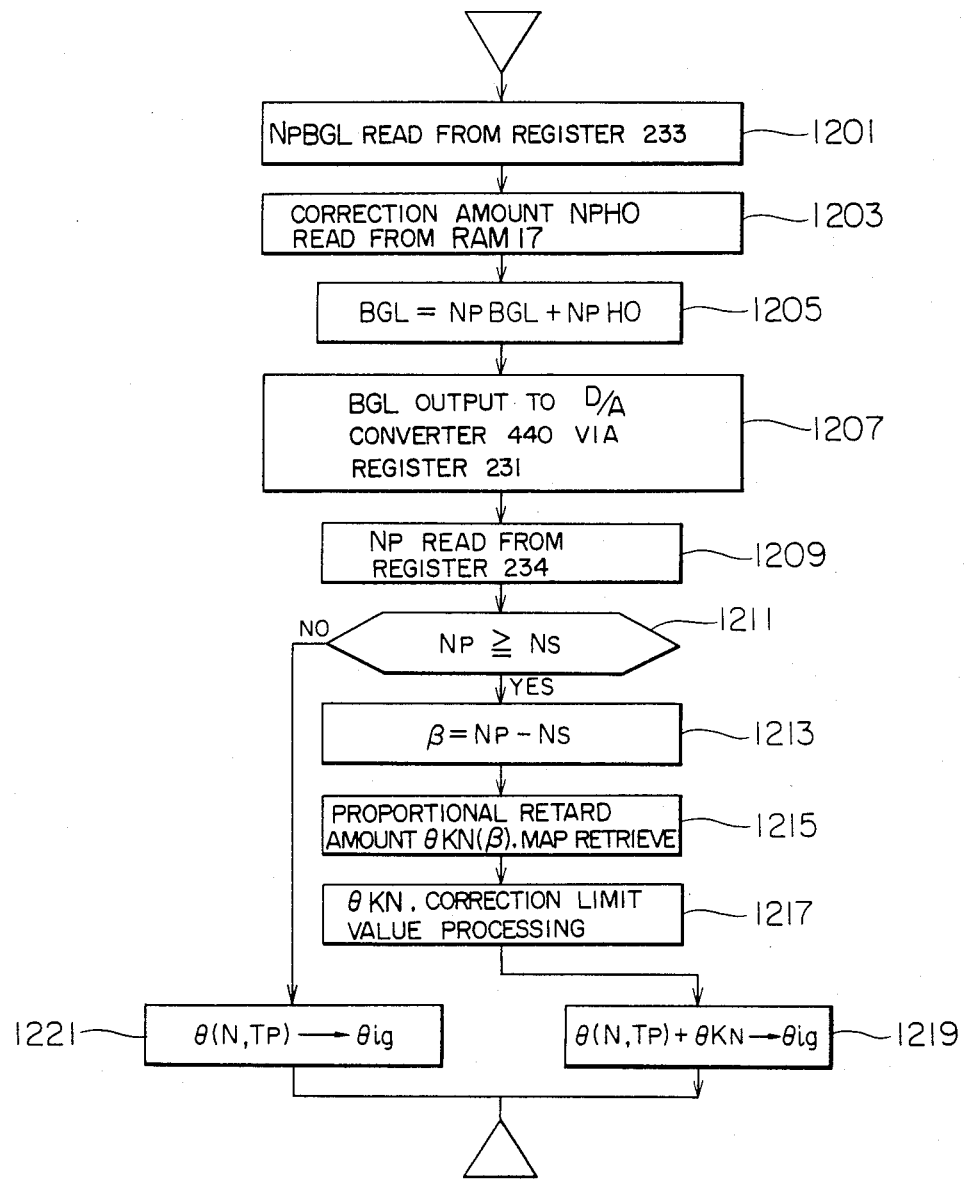
FIG. 12 is a flow chart of a knock correction routine in the second embodiment.

FIG. 12 illustrates a knock correction routine in this embodiment. Since steps 1209 to 1221 are the same as the steps 802 to 809 in FIG. 8, the description of these steps are omitted. At step 1201 the background signal $N_P BGL$ is read from the register 233, and an amount of correction $N_P HO$ which will be described hereinafter is read from the backup RAM 17. The amount of correction $N_P HO$ is added to the background signal $N_P BGL$ (step 1205) and stored in the register 231 as the judging level signal BGL. The D/A converter 440 D/A converts the judging level signal stored in the register 231, and outputs the resultant signal to the comparator 409.

After setting the judging level of the comparator 409 in this manner, knock correction of the ignition timing is performed at steps 1209 to 1219.

Figure 13:
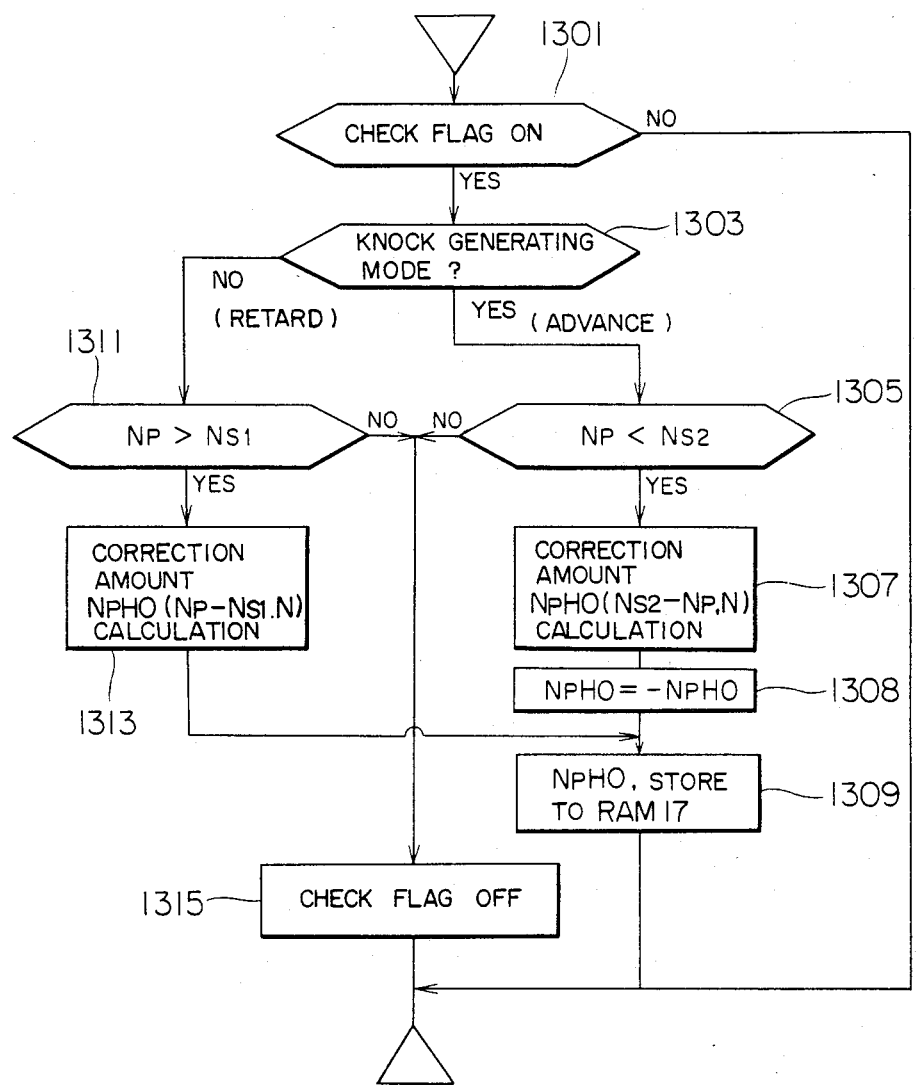
FIG. 13 is a flow chart of a correction amount calculation routine in the second embodiment.

Referring to FIG. 13, a calculation routine of the amount of correction $N_P HO$ will be described. In the ignition timing control routine in FIG. 7 in the first embodiment, the check of the knock judging level is performed, and if the check flag is set to ON, at step 1303 whether knock generating mode or not is determined.

In the case where it is determined that the knock generating mode is in existence; since the judging level BGL is too high when the knock pulse number $N_P$ is less than the set value $N_{S2}$, at step 1307 the amount of correction $N_P HO$ is calculated based on the difference between the knock pulse number $N_P$ and the set value $N_{S2}$, and engine revolution number N. At step 1308 the correction amount $N_P HO$ is made a negative value in order to correct the judging level signal BGL toward decreasing the value. At step 1309 the correction amount $N_P HO$ in the backup RAM 17 is rewritten into the negative signed value obtained at step 1308. At step 1305, if it is $N_P \geq N_{S2}$, the correction amount $N_P HO$ is regarded as requiring no amendment, and the correction amount $N_P HO$ stored in the backup RAM 17 at present is used. At step 1315 the check flag is set to OFF and completes the check of the judging level.

In the case where it is not determined that the knock generating mode exists; since the judging level is too low when the knock pulse number $N_P$ is larger than the set value $N_{S1}$, at step 1313 the amount of correction $N_P HO$ is calculated based on the difference between the knock pulse number and the set value, and engine revolution number N. At step 1309 the correction amount $N_P HO$ stored in the backup RAM 17 is rewritten into a value calculated at step 1313. At step 1311, if it is determined $N_P \leq N_{S1}$, it is regarded as no amendment of the correction amount is required, and the correction amount stored in the backup RAM at present is used. At step 1315 the check flag is set to OFF, and completes the check of the judging level BGL.

Figure 14:
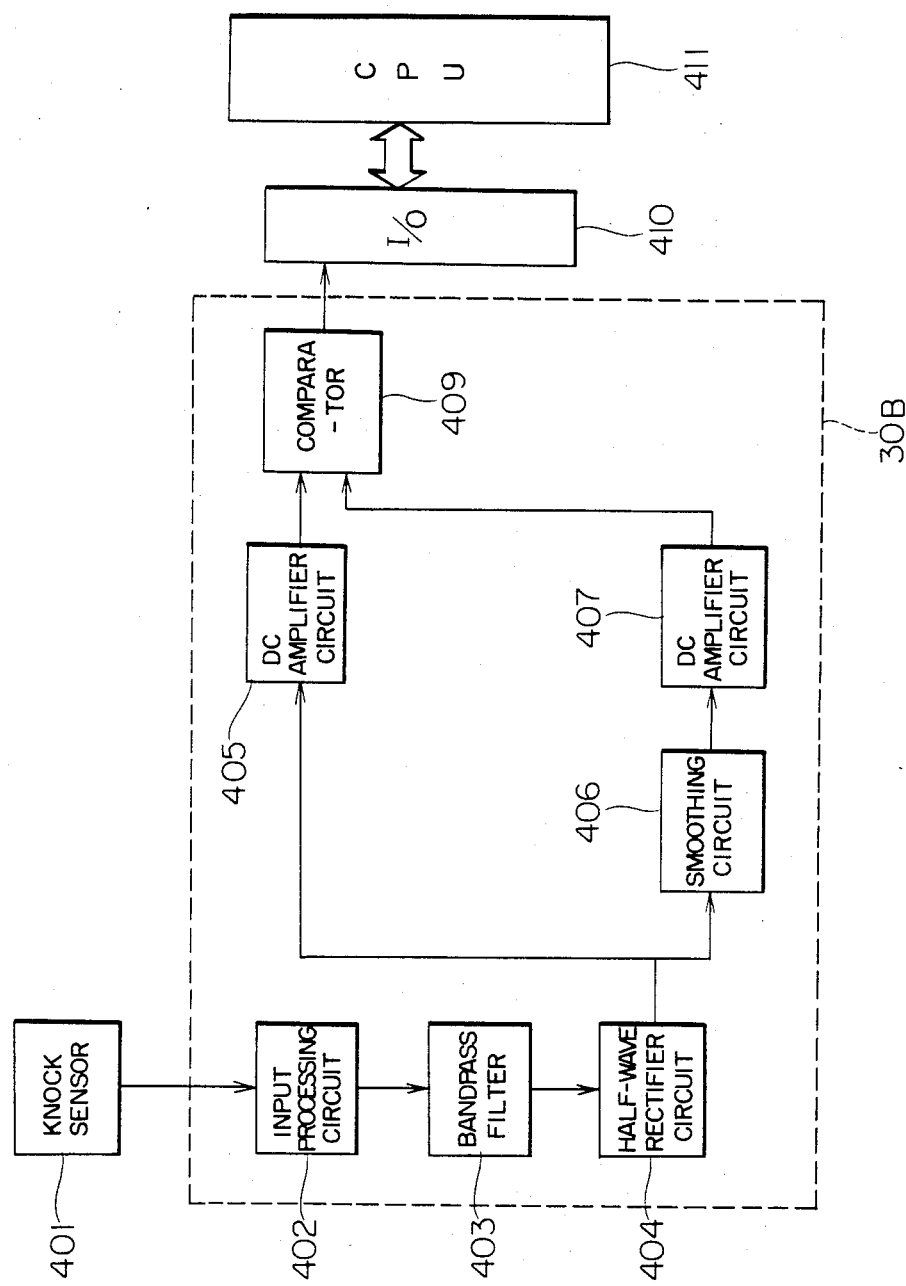
FIG. 14 is a block diagram of a knock detecting device in a third embodiment.
Figure 15:
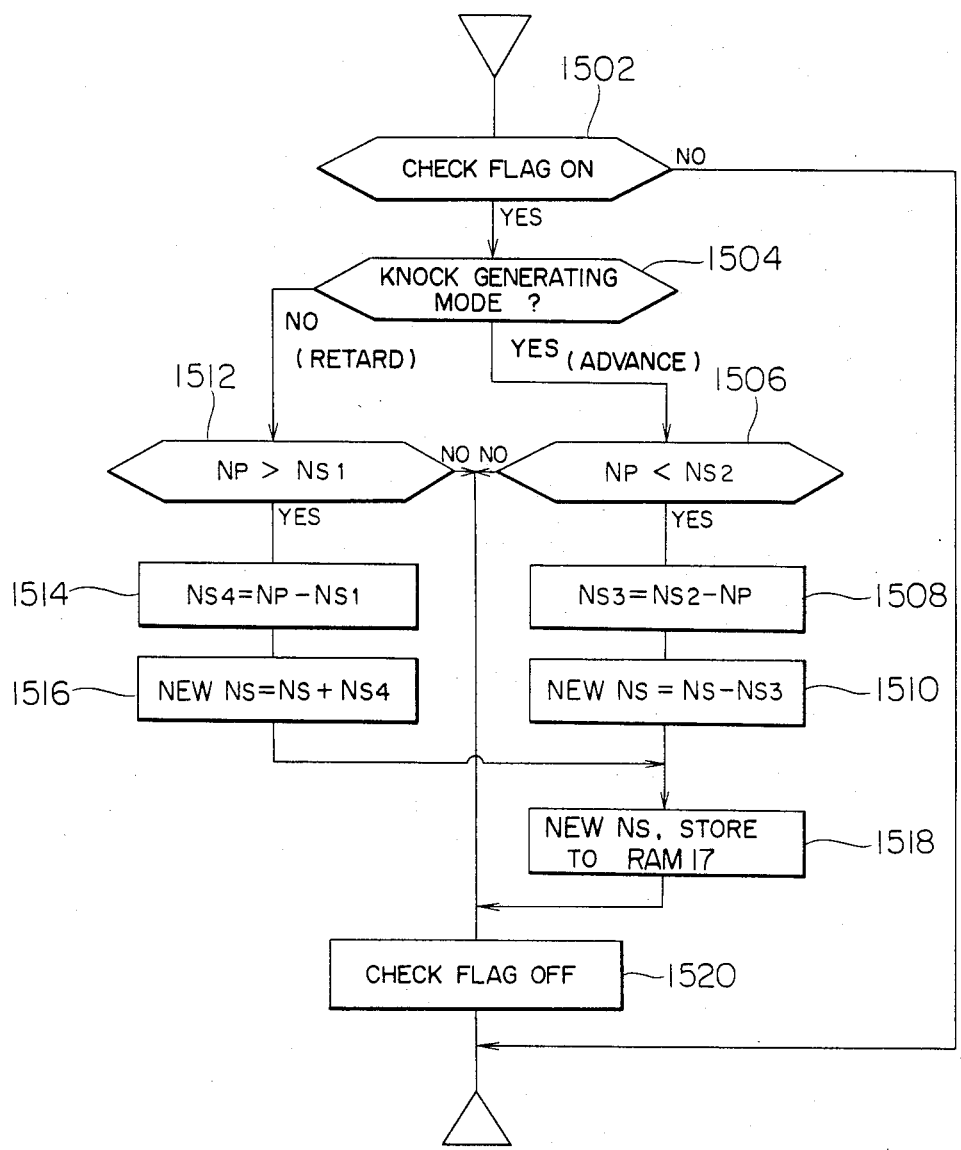
FIG. 15 is a flow chart of a knock correction routine in the third embodiment.

Referring to FIGS. 14 and 15, a third embodiment of the present invention will be described.

In this embodiment, as shown in FIG. 14, as a judging level signal of a comparator 409, only a signal obtained by smoothing after half-wave rectifying the knock sensor output is amplified by a DC amplifier 407 and applied to the comparator 409. And hence, the judging level in the comparator 409 is not corrected.

This embodiment is featured in that the judging level for knock signal is corrected by software in the CPU.

FIG. 15 shows a knock signal correction routine. In the routine in FIG. 7 in the first embodiment, if the check flag becomes ON, at step 1514 whether knock generation mode or not is determined.

In the case of knock generation mode; at step 1506, if it is determined that a knock pulse number $N_P$ is less than a set value $N_{S2}$, at step 1508 a difference $N_{S3}$ between the knock pulse number $N_P$ and the set value $N_{S2}$ is obtained. At step 1510 the set pulse number $N_S$ which is used in the knock correction routine in FIG. 8 to determine the presence or absence of knock is decreased by a number $N_{S3}$ thereby lowering the judging level. At step 1518 the set pulse number $N_S$ stored in the backup RAM 17 is rewritten into a new set pulse number $N_S$. At step 1506, if it is determined that $N_P \geq N_{S2}$, it is regarded as no correction of the set pulse $N_S$ is required, and at step 1520 the check flag is set to OFF and completes the check.

In the case, it is not the knock generating mode; at step 1512, if it is determined that the knock pulse number $N_P$ is less than a set value $N_{S1}$, at step 1514 a difference $N_{S4}$ between the knock pulse number $N_P$ and the set value $N_{S1}$ is obtained. At step 1516 the set pulse number $N_S$ is increased by the number $N_{S4}$ thereby raising the judging level. At step 1518 the set pulse number $N_S$ is rewritten, and at step 1520 the check flag is set to OFF and completes the check.

In the second and third embodiments, only one value is set for the correction amount $N_P HO$ and for the set value $N_S$. However, if $N_P HO$ and $N_S$ are set for each of engine revolution number ranges (e.g., the ranges are set for each 1000 r.p.m.), and the correction of the knock judging level is performed for each engine revolution number range after a predetermined time elapes from the start of the engine, and thereafter the knock correction is carried out for each engine revolution number range using the corrected $N_P HO$ and $N_S$, then further fine control of the ignition timing will be achieved.

Figure 21:
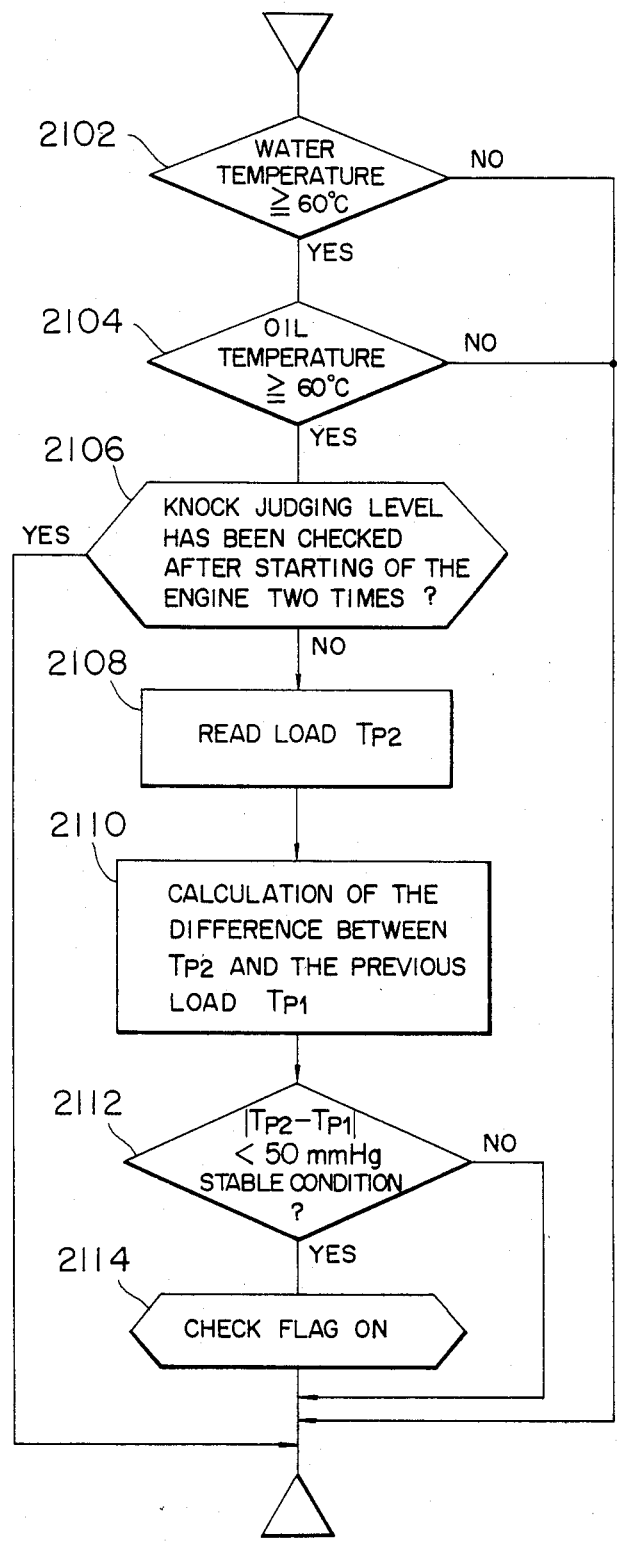
FIG. 21 is a flow chart for establishing the check flag ON signal.

In this respect, the check of the knock detection sensitivity is required to be conducted under such conditions as shown in FIG. 21, in which after starting the engine, water temperature, oil temperature, etc. reach the steady conditions (for example, water temperature $\geq 60°$ C., oil temperature $\geq 60°$ C.) and each of the structural parts (a shaft, spring, etc. which determines a valve clearance of the intake and exhaust values) of the engine becomes stable with respect to temperature thereof. See steps 2102, 2104 of FIG. 21. Furthermore, the times of checks should not be too many, for example, it is considered reasonable in which during one hour or one day travel, a particular cylinder, at least one or two cylinder, is advanced to the knock zone only for several ignitions, or the particular cylinder is retarded to the non-knock zone only for several ignitions. For this reason, the check of the knock judging level is conducted one or two times after about ten minutes from the start of the engine. See the step 2106 of FIG. 21. Thereafter, it is necessary not to change the data until the engine stops, and even after the engine operation is stopped, it is necessary to store the corrected judging level in the backup RAM 17 in order to prepare for the next engine start.

Figure 8:
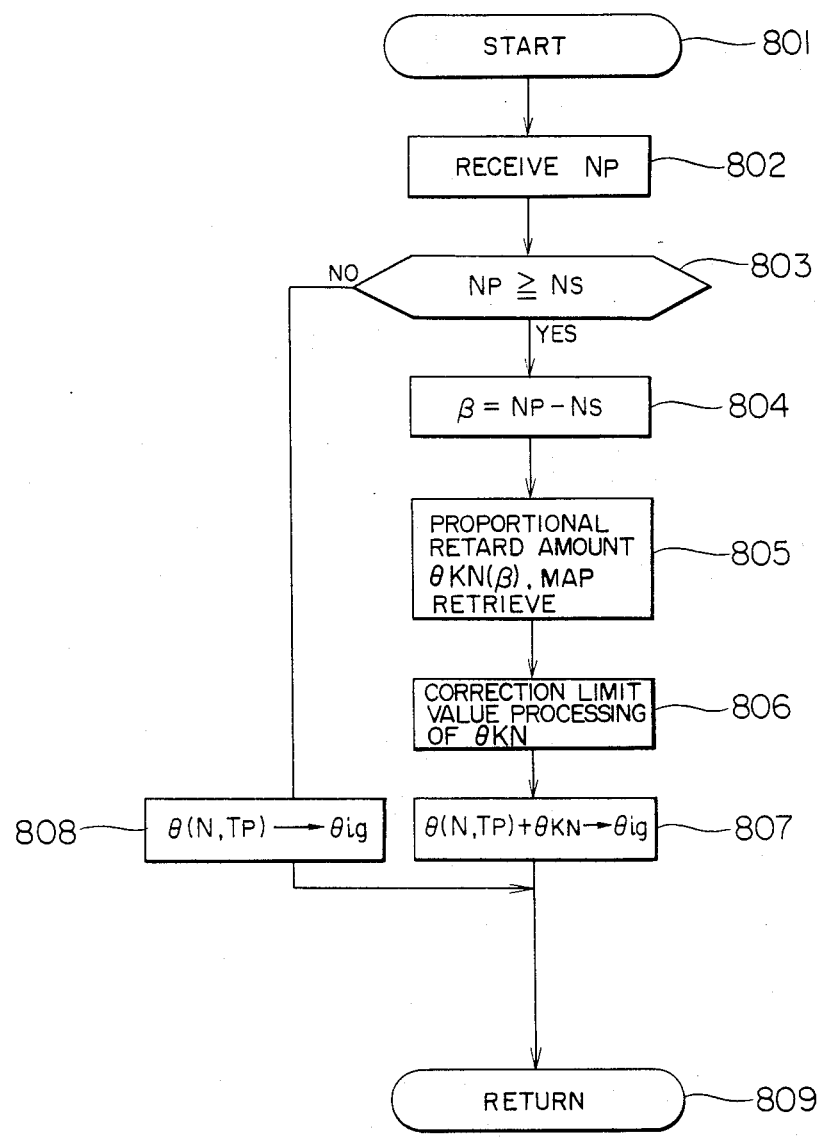
FIG. 8 is a flow chart of a knock correction routine.

However, after checking and correcting the knock judging level, if the frequency of knock corrections conducted under an operating condition in a particular area and conducted in accordance with the flow chart of FIG. 8 is too high (the number of times in which the control unit determines that knock is generating is too many) or, on the contrary, if the frequency of knock correction is too small (that is, the control unit continues to decide that knock is not occuring), it is necessary to check the knock judging level at intervals of several seconds or several minutes.

Furthermore, the timing of conducting the check of the knock judging level is preferably selected when the engine load is in stable condition (Step 2112), since the correction error is small. For example, it might be better to conduct the check when the CPU determines that the steady operation has been reached. The conditions for this steady operation includes, for example, a change in load $T_P$ is less than 50 mmHg in a period of 100 msec, and it is determined that both temperature and load are stable. In particular, when a pressure sensor or the like is used as a load sensor to detect the inner pressure in an engine manifold, it is absolutely necessary to correct the knock judging level in the steady engine operation (conditions described above) since the pressure sensor involves a response delay. However, as a load sensor, if a sensor with quick response such as a sensor for metering the flow rate of intake air of the engine (e.g., a hot wire type air flow meter) is used, since this sensor can responce to a considerable load variation, a proper correction of the knock judging level can be achieved even under transient operating conditions including rapid acceleration, deceleration, etc.

Furthermore, in this system, only a several times of checks (only for a particular cylinder) are carried out during operating condition for several hours, and thus the operator of the engine seldom experiences unpleasant feelings. However, depending on the type of engine, if the check is conducted during acceleration of the engine by intentionary retarding the ignition timing of one particular cylinder, or during deceleration by advancing the ignition timing to a knock zone, the operator will never experience unpleasant feelings. In this respect, to cause knocking during deceleration will be somewhat difficult due to light load of the engine. The "check flag ON" of the step 2114 means to generate an interruption signal.

In the first to third embodiments, as described in the foregoings, both cases of intentionary retarding and advancing the ignition timing are used jointly. However, it is practically possible to employ only the method of checking the knock by intentionary retarding the ignition timing without using the method of advancing the ignition timing intentionary. Such an embodiment will be described hereinafter.

Figure 16:
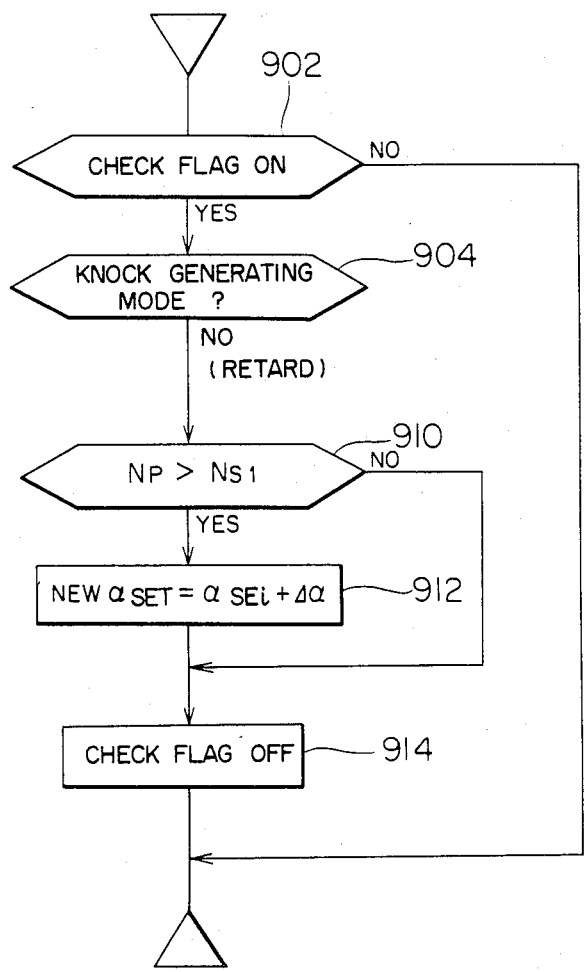
FIGS. 16 to 18 are flow charts of variants of the first to third embodiments and respectively correspond to FIGS. 9, 13 and 15.

At first, in the first embodiment of the present invention described primarily referring to FIGS. 4, 7 and 9, the correction of knock judging level in the check mode will be achieved in accordance with a flow chart as shown in FIG. 16. As will be apparent from FIG. 16, in FIG. 16, steps 906 and 908 in FIG. 9 are omitted. This is because that the case wherein the knock checking is carried out by intentionary advancing the ignition timing is omitted, and the operation in the following steps will now be described since they are similar to that described referring to FIG. 9.

Figure 17:
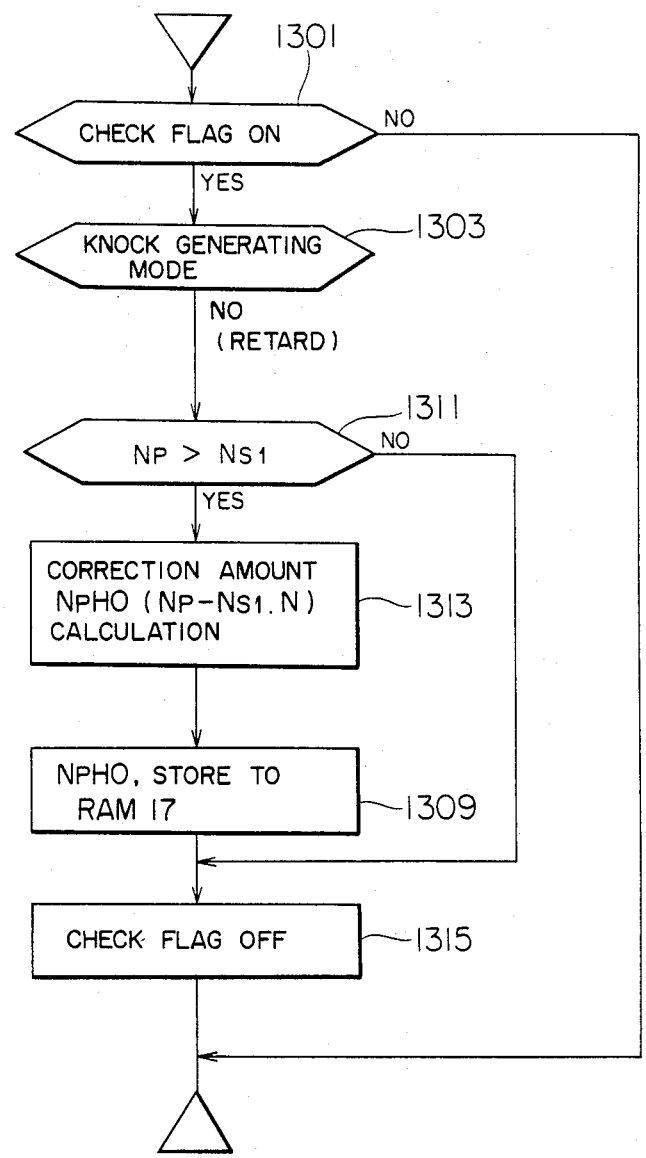

Similarly, in the second embodiment described primarily referring to FIGS. 10 and 13, the correction of knock judging level is possible in accordance with a flow chart shown in FIG. 17. As will be apparent from FIG. 17, steps 1305, 1307 and 1308 in the flow chart of FIG. 13 are omitted, and similar to that mentioned above, the case wherein the knock judging is carried out by intentionary advancing the ignition timing is omitted.

Figure 18:
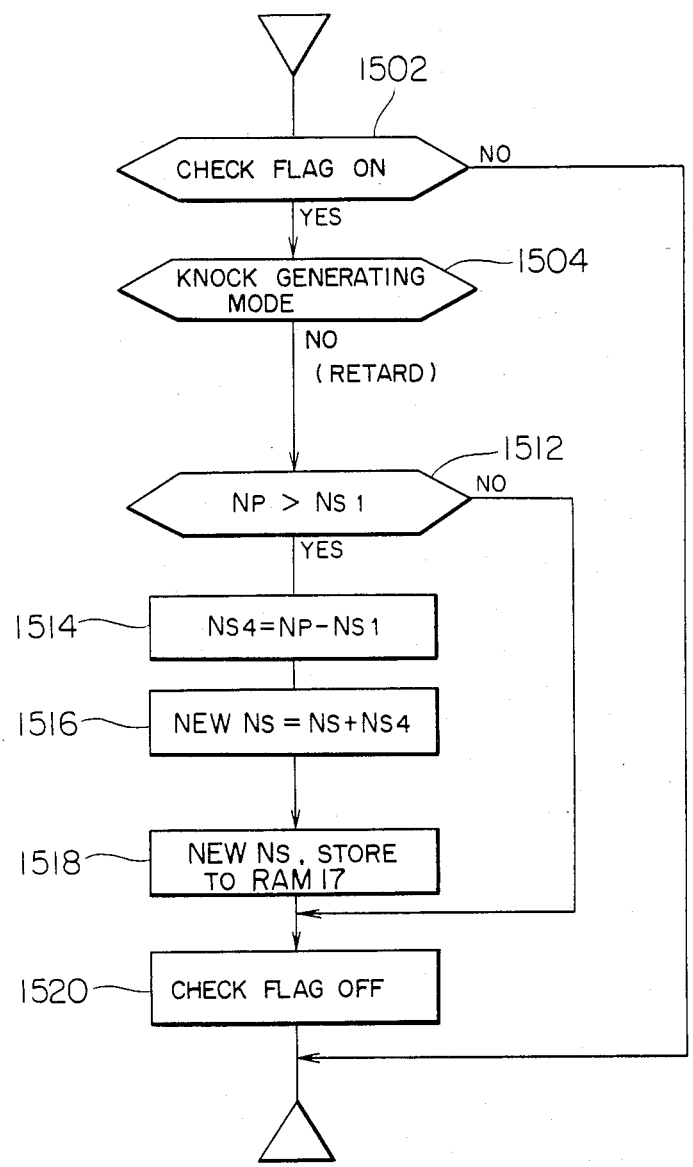

Similar to the variants of the second and third embodiments described in the foregoing, a variant of the third embodiment (FIGS. 14 and 15) is illustrated in a flow chart of FIG. 18.

FIG. 19 shows a relationship between engine revolution number N and engine load $T_P$, and the engine load $T_P$ is represented by engine negative pressure, and characters L, M and H respectively represent light load, middle load and heavy load. In FIG. 19, it means that engine operating conditions under the light load L does not correspond to the knock checking mode area, and that the engine operating conditions under the loads M and H correspond to the knock checking mode area. The knock checking mode areas is further classified into four subareas $N_{R1}$, $N_{R2}$, $N_{R3}$ and $N_{R4}$.

Figure 20:
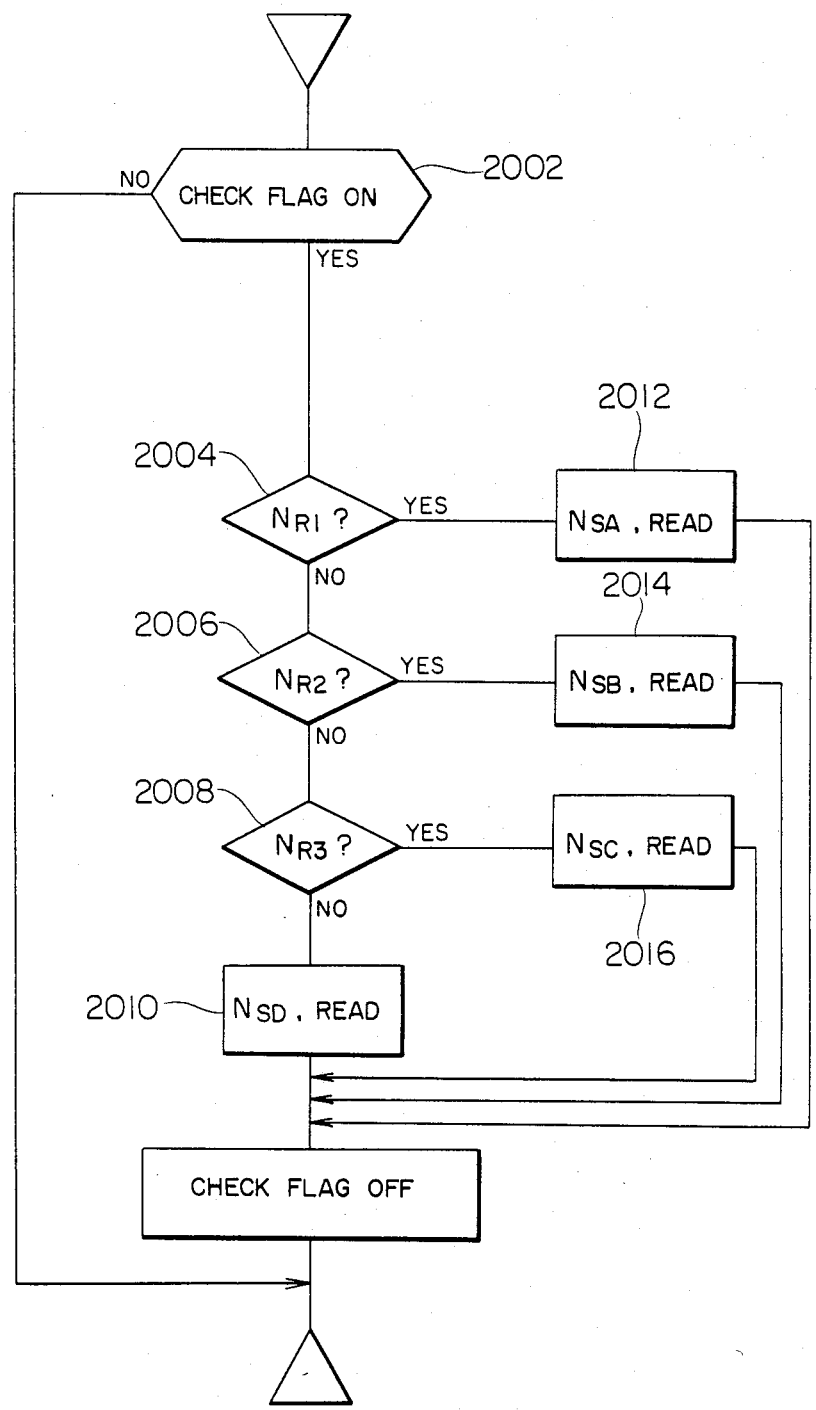
FIG. 20 is a flow chart for reading out set pulse numbers corresponding respectively to operating condition areas.

FIG. 20 is a flow chart wherein when it is detected at step 2002 that an engine operating condition enters the knock checking mode area, at steps 2004, 2006, 2008 and 2010 it is determined that to which subarea $N_{R1}$, $N_{R2}$, $N_{R3}$ or $N_{R4}$ of FIG. 19 the present engine operating condition corresponds, and set pulse number $N_{SA}$, $N_{SB}$, $N_{SC}$ or $N_{SD}$ corresponding to the determined subarea is read out from a table stored in a memory. For example, at step 2004 when the engine operating condition is determined to be in the $N_{R1}$ area, then at step 2012 the set pulse number $N_{SA}$ is read out. The read $N_{SA}$ is used in place of the set pulse number $N_S$ in the first to third embodiments and in place of the set pulse number $N_{S1}$ and $N_{S2}$ in the variants of these embodiments described above.

As described in the foregoings, according to the present invention, when operating the checking means, in place of a normal ignition timing based on the output of knock detecting means, means for generating ignition timing for checking is provided, and the ignition is effected by the ignition timing for checking. The reaction of the knock checking means to the ignition thus caused is checked to check the sensitivity of the knock detecting means. As a result, it enables to check not only whether the knock detecting means is operating but also whether the knock detecting means provides required sensitivity, and thus more precise check can be achieved. Furthermore, the output of the checking means can be utilized to adjust the detection sensitivity of the detecting means, and a multifunction ignition timing control apparatus can be obtained.

We claim:

1. An ignition timing control apparatus for an internal combustion engine comprising:
    a vibration sensor for detecting vibrations of said engine including knocking vibrations;
    a knock detecting device for discriminating said knock vibrations by comparing the output of said vibration sensor with a predetermined level signal;
    means for controlling ignition timing based on the output of said knock detecting device;
    checking means for checking the detection sensitivity of said knock detecting device;
    checking ignition timing generating means operable during the checking operation of said checking means for generating predetermined checking ignition timing, for at least one cylinder of said internal combustion engine, preset for the purpose of sensitivity check of said knock detecting device instead of generating a normal ignition timing obtained based on the output of said knock detecting device; and means for correcting the sensitivity of said knock detecting device by checking by said checking means the reaction of said knock detecting device when ignition occurs by said checking ignition timing.

2. An apparatus according to claim 1, wherein said checking ignition timing is an ignition timing in an area where knock does not occur.

3. An apparatus according to claim 1, wherein said checking ignition timing is an ignition timing in an area where knock occurs.

4. An apparatus according to claim 1, wherein said checking ignition timing generating means includes means for alternatively selecting depending on engine operating condition whether said checking ignition timing is to be an ignition timing in a knock occuring area or to be an ignition timing in an area in which knock can never occur.

5. An apparatus according to claim 4, further comprising:
means for adjusting detecting sensitivity of said knock detecting device, said adjusting means being controlled in accordance with the output of said checking means thereby to control the detecting sensitivity of said knock detecting means.

6. An apparatus according to claim 1, further comprising:
means for adjusting detecting sensitivity of said knock detecting device, said adjusting means being controlled in accordance with the output of said checking means thereby to control the detecting sensitivity of said knock detecting means.

7. An apparatus according to claim 1, wherein said check ignition timing generating means is operated at the time of engine acceleration operation and generates an ignition timing in a knock occuring area.

8. An apparatus according to claim 1, wherein said check ignition timing generating means is operated at the time of engine deceleration operation and generates an ignition timing in which knock can never occur.

9. An apparatus according to claim 1, wherein said checking ignition timing generating means uses as a set pulse number for generating said checking ignition timing a set pulse number predetermined corresponding to an engine operating condition area.

10. An apparatus according to claim 1, said sensitivity check of said knock detecting device is made when a water temperature has reached to a predetermined value.

11. An apparatus according to claim 1, said sensitivity check of said knock detecting device is made when an oil temperature has reached to a predetermined value.

12. An apparatus according to claim 1, said sensitivity check of said knock detecting device is made when said internal combustion engine has reached to a stable condition in an engine load.

* * * * *